United States Patent [19]

Itoh et al.

[11] Patent Number: 4,519,269

[45] Date of Patent: May 28, 1985

[54] TRANSMISSION SYSTEM IN A CAM MECHANISM

[75] Inventors: Yukio Itoh; Kazuki Takai; Satoshi Takagi, all of Tokyo, Japan

[73] Assignee: Clarion Co., Ltd., Tokyo, Japan

[21] Appl. No.: 387,909

[22] Filed: Jun. 11, 1982

[30] Foreign Application Priority Data

Jun. 19, 1981 [JP] Japan .................................. 56-94838
Jun. 23, 1981 [JP] Japan .................................. 56-95937

[51] Int. Cl.³ .......................... G11B 5/54; G11B 21/22
[52] U.S. Cl. ................................. 74/483 R; 360/96.1; 360/105
[58] Field of Search ..................... 74/483 R; 360/74.1, 360/74.2, 74.3, 96.1, 96.2, 96.3, 96.5, 104, 105

[56] References Cited

U.S. PATENT DOCUMENTS 4,167,764  9/1979  Hamajima et al. ................... 360/90
4,373,172  2/1983  Motoyama et al. ................ 360/96.4

FOREIGN PATENT DOCUMENTS 0064651  5/1980  Japan ................................ 360/96.5
1563081  3/1980  United Kingdom ............... 360/96.5

Primary Examiner—Lawrence J. Staab
Attorney, Agent, or Firm—Flynn, Thiel, Boutell & Tanis

[57] ABSTRACT

A transmission system in a cam mechanism having a cam and a driven member to be driven by the cam which comprises an electromagnetic plunger and a control member for having said driven member be driven by said cam while said electromagnetic plunger is energized and releasing said driven member from driving force of said cam when said electromagnetic plunger is deenergized.

4 Claims, 10 Drawing Figures

TRANSMISSION SYSTEM IN A CAM MECHANISM

BACKGROUND OF THE INVENTION

This invention relates to a transmission system in a cam mechanism.

In a magnetic tape recording/reproducing device, for example, there is a transmission system using a cam in order to achieve various changeover motions like auto-reverse motion, action for press-fitting or releasing a head, setting or taking out a cassette, etc. Such transmission system is so arranged that an operating member for performing various changeover actions is directly connected to a cam for driving the operating member to directly transmit the driving power of the cam to the operating member (in other words, a driven member of the cam).

However, such transmission system, if a power source is interrupted to stop a motor or a user wants to do another operation in the middle of the changeover action of the operating member, has the following drawbacks. That is, if the power source is cut off and the motor stops in the middle of the action of the cam for press-fitting the head or setting a cassette, for example, the head or the cassette stops halfway in an unstable condition whereby to make it impossible to take out the cassette. Further, if a user is going to do an operation causing a head releasing action such as stop operation, fast forwarding/rewinding operation, eject operation, etc. in the middle of the action of the cam for press-fitting the head or if a user is going to eject the cassette in the middle of the action of the cam for setting the cassette at its play position, he has to wait until these actions are completed because forcible operations often damage heads, etc.

OBJECT OF THE INVENTION

It is therefore an object of the present invention to overcome the above-mentioned conventional drawbacks by providing a transmission system in a cam mechanism capable of releasing the transmission relation between the cam and a driven member even in the middle of the action of the driven member.

SUMMARY OF THE INVENTION

In accordance with the present invention there is provided a transmission system which comprises:
a power member supplied with power;
an engage member intermittently engageable with said power member;
a cam member movable simultaneously with said engage member;
a changeover member to be driven by said cam member;
a select means for having said changeover member to start moving in response to said cam member or to stop moving;
an operating member movably mounted;
a control member located between said changeover member and said operating member for having said operating member shift in response to movement of said changeover member;
a lock member for locking said control member when said operating member reaches a predetermined position to hold said operating member there; and
a release member for releasing said control member from the lock by said lock member.

DETAILED DESCRIPTION OF THE PREFERRED EMBODIMENTS

Figure 1:
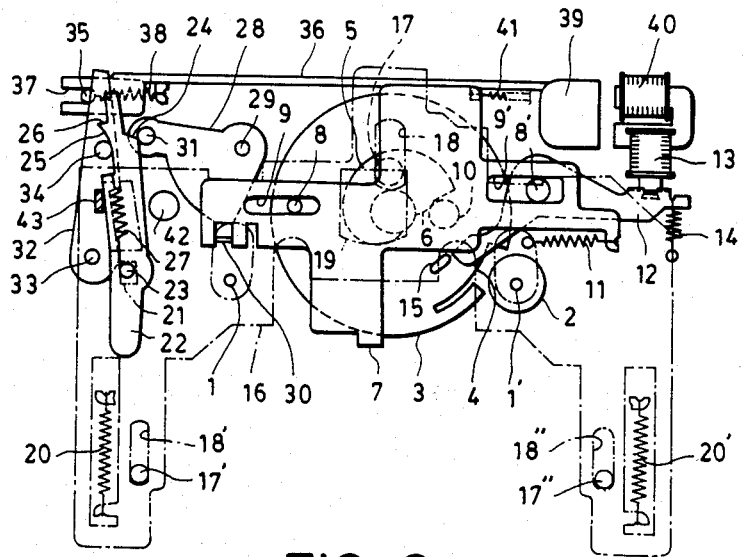
FIGS. 1 to 6 are plan views showing different states of operation of an embodiment according to the present invention.

The present invention will now be described in detail referring to the preferred embodiments illustrated in the drawings.

FIGS. 1 to 6 show an embodiment applied to action for press-fitting a head. In the description related to these and subsequent drawings, words like "up", "down", "right", "left", etc. mean directions in the drawings. Reference numerals 1 and 1' each denote a capstan mounted on a fixture frame (not shown). Reference numeral 2 refers to a gear coaxially mounted with the capstan 1' for integral rotation by a motor not shown, 3 to an intermittent gear mounted on the fixture frame and having teeth portion, excluding a cut-off portion 4, adapted to be in meshing engagement with the gear 2, 5 to a cam integrally formed on the intermittent gear 3 and having a step portion 6 at the radial edge thereof. Reference numeral 7 designates a changeover member having elongated holes 9 and 9' which are in engagement with guide pins 8 and 8' provided on the fixture frame, permitting the changeover member to move in the right and left directions. Numeral 10 refers to a roller (or a pin) provided on the changeover member 7 for engagement with the cam 5, and 11 refers to a spring leftwardly biasing the changeover member 7. Tensile force of the spring 11 causes the roller 10 to get in contact with the cam 5. As shown in FIG. 1, when the intermittent gear 3 is positioned so as to be out of engagement with the gear 2, the roller 10 is in contact with the step portion 6 of the cam 5, so that the force of the roller 10, which is urged to move leftward, urges the intermittent gear 3 to rotate in an anti-clockwise direction toward a position for engaging with the gear 2. Against this force, a stopper member 12 keeps the intermittent gear 3 staying at the position as shown in FIG. 1. The stopper member 12 is pivotally supported by the guide pin 8' and is positioned as shown in FIG. 1 due to the tensile force of a spring 14 while a release plunger 13 mounted on the fixture frame is deenergized. A protuberance 15 formed on the intermittent gear 3 is engaged with the stopper member 12 to thereby make the intermittent gear 3 stay there.

Figure 2:
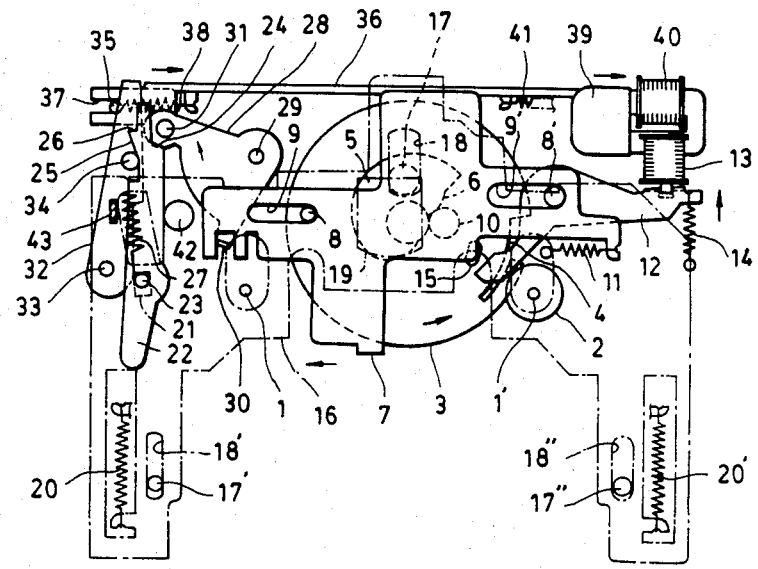

Reference numeral 16 denotes an operating member having a stroke limit hole 18 and elongated holes 18' and 18" which are in engagement with guide pins 17, 17' and 17", respectively, so that the operating member 16 may move in up and down direction up to the limited stroke. Numeral 19 refers to a head mounted on the operating member 16, and, 20 and 20' to springs for upwardly energizing the operating member 16. When the lowermost end of the stroke limit hole 18 is in contact with the guide pin 17, the head 19 is in released condition. Numeral 21 refers to a slightly longitudinally elongated hole formed in the operating member 16 and 22 to a control member pivotally supported with its supported point 23 being inserted in the hole 21 for up and down movement. The control member 22 has a slanting surface 24 formed at the upper and right side thereof and a downwardly slanting surface 25 as well as an upwardly slanting surface 26 both formed at the upper and left side thereof. Numeral 27 designates a spring for upwardly energizing the supported point 23 of the control member 22 toward the operating member 16. The spring force of the spring 27 is larger than those of the springs 20 and 20', so that when the control member 22 is in an upper position as shown in FIGS. 1 and 2, of course, and also when it is pushed downward as shown in FIG. 3, the supported point 23 is kept contacting with the uppermost end of the hole 21 until the uppermost end of the stroke limit hole 18 gets in contact with the guide pin 17 so as not to let the operating member 16 shift downwardly any more.

Figure 5:
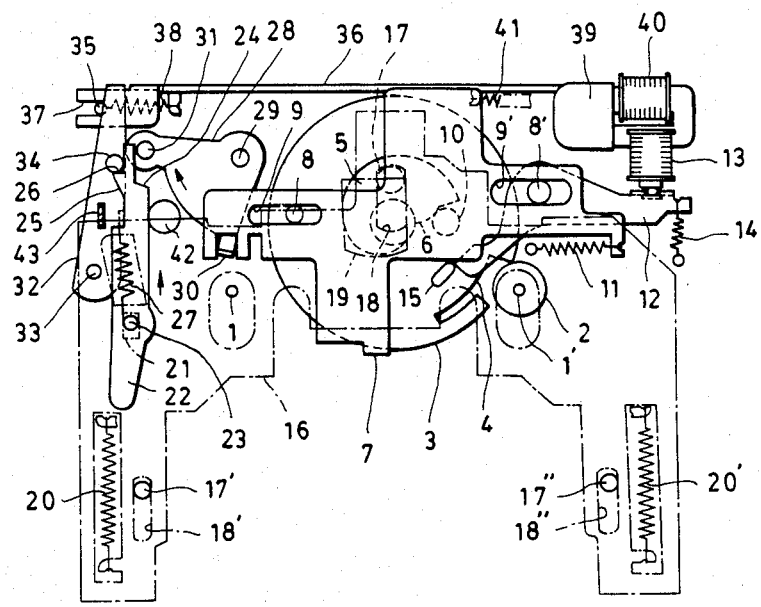

Numeral 28 is a sector member pivotally supported on the fixture frame. The sector member 28 has an engage portion 30 being in engagement with the leftmost slit of the changeover member 7 so that, in response to right and left movement of the engage portion 30 due to movement of the changeover member 7, a protuberance 31 formed on the sector member 28 and being in engagement with the slanting surface 24 of the control member 22 moves upward and downward. Numeral 32 is a lock member pivotally supported with its supported point 33 on the fixture frame. The lock member 32 has a protuberance 34 for engaging with the slanting surfaces 25 and 26 as well as an engage portion 35 formed at the upper portion thereof. Numeral 36 refers to a holding member, 37 to a hole formed at the leftmost end of the holding member 36 for engagement with the engage portion 35 of the lock member 32, 38 to a spring for energizing the engage portion 35 toward the right and bottom end of the hole 37 and rightwardly with respect to the holding member 36, 39 to a movable core provided at the rightmost end of the holding member 36 for being in cooperation with a holding plunger 40 mounted on the fixture frame, and, 41 to a spring for rightwardly energizing the holding member 36 so as to cause the movable core 39 to engage the holding plunger 40. Spring force of the spring 38 is larger than that of the spring 41, so that when the movable core 39 is attracted by the holding plunger 40 as shown in FIG. 5 and the protuberance 34 of the lock member 32 is in contact with the upward slanting surface 26 of the control member 22 to prevent upward movement of the control member 2, the spring force of the spring 38 holds that locked condition, while when the holding plunger 40 is deenergized, the lock member 32 rotates in the anti-clockwise direction against the spring 41 to thereby release the locked condition.

Figure 3:
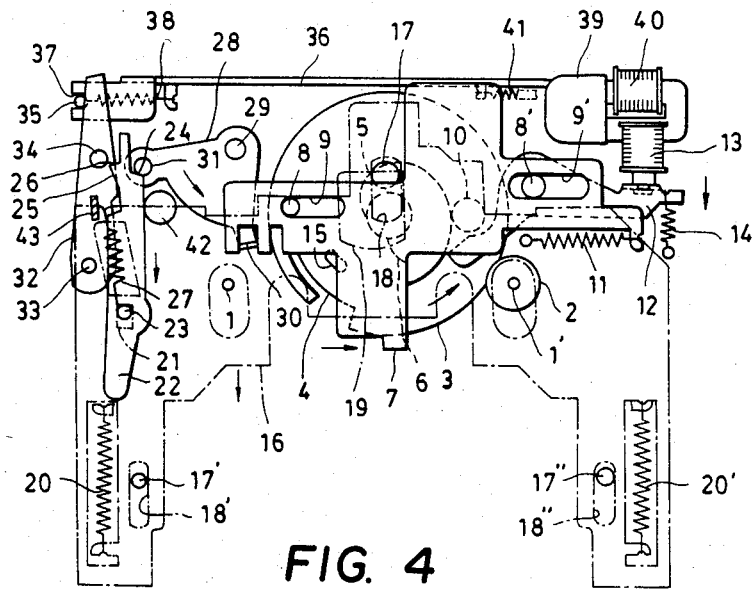
Figure 6:
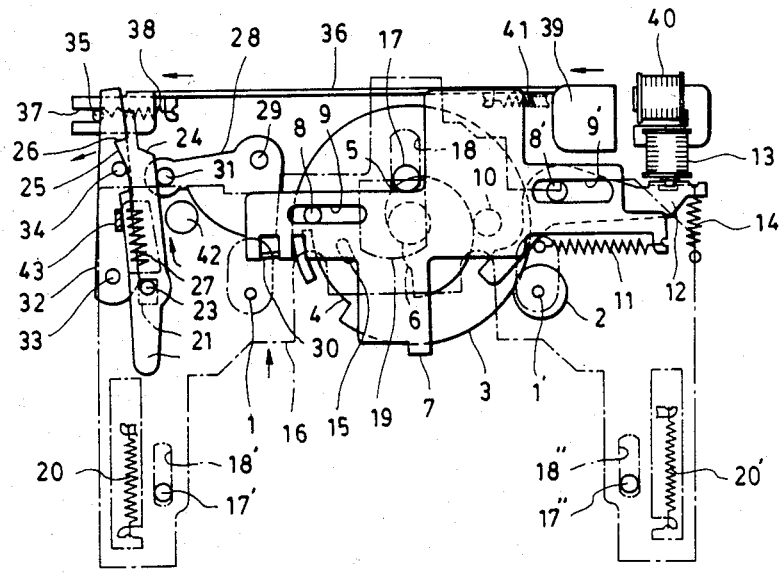

Numeral 42 refers to a stopper provided on the fixture frame for restricting clockwise rotation of the control member 22 and 43 refers to a limit plate also provided on the fixture frame for limiting anti-clockwise rotation of the control member 22 in order to prevent it from rotating in anti-clockwise direction even after the slanting surface 24 of the control member 22 gets out of engagement with the protuberance 31 of the sector member 28 while the control member 22 moves from the position shown in FIG. 3 to the position shown in FIG. 6 which may make it difficult for the upward slanting surface 26 to get out of engagement with the protuberance 34 of the lock member 32.

The system constructed as above described functions as follows. First, the system is in the state as shown in FIG. 1 while it stands still. When a cassette, for example, is thereafter inserted, the released plunger 13 is energized to cause the stopper member 12 to rotate in an anti-clockwise direction to thereby move away from the protuberance 15. Then, the roller 10 pushes the step portion 6 due to tensile force of the spring 11 and moves to the left thereby rotating the cam 5 in an anti-clockwise direction. Due to rotation of the cam 5, the intermittent gear 3 which is integral with the cam 5 rotates in the same direction to get in meshing contact with the gear 2 which is made to rotate in a clockwise direction by the motor. On the other hand, due to leftward movement of the changeover member 7 following to the leftward movement of the roller 10, the protuberance 31 of the sector member 28 moves upward to thereby get out of engagement with the right lateral surface of the control member 22 and to be positioned above the slanting surface 24, so that the control member 22 can rotate in clockwise direction. Thus, the control member 22, lock member 32 and holding member 36 move in clockwise direction and to the right due to tensile force of the spring 41 to cause the movable core 39 to be attracted by and held by the holding plunger 40 (ref.: FIG. 2).

The intermittent gear 3 which is in meshing engagement with the gear 2 sequentially rotates in the same direction so that the cam 5 pushes the roller 10 to make the changeover means 7 move to the right. Accordingly the protuberance 31 of the sector member 28 moves downward to the slanting surface 24 to thereby push the control member 22 downwardly. When the control member 22 is pushed downward, the operating member 16 is pushed downward integrally with the control member 22 until the uppermost end of the stroke limit hole 18 gets in contact with the guide pin 17 while the lock member 32 rotates in anti-clockwise direction against tensile force of the spring 38 because the protuberance 34 thereof is pushed by the downward slanting surface 25 of the control member 22 (Ref.: FIG. 3).

Figure 4:
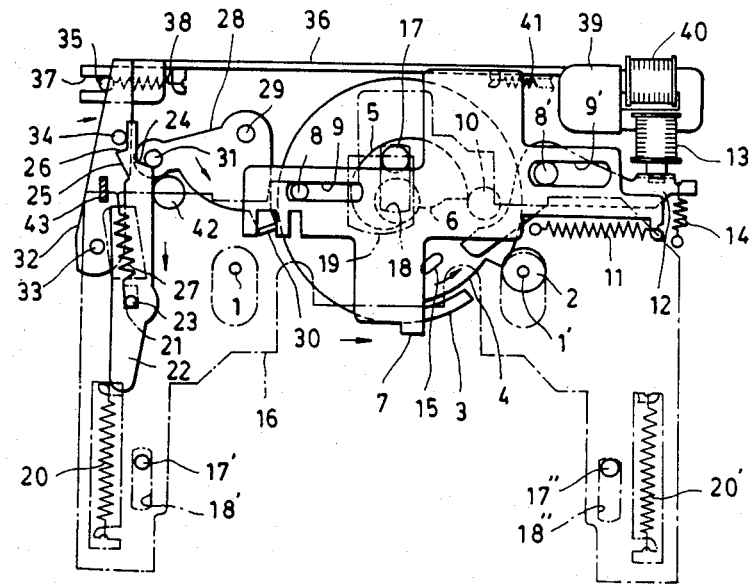

Even after the operating member 16 reaches the lowermost end (namely, the position where the head 19 is press-fit), the control member 22 is still continuously pushed downward until the roller 10 reaches the highest position of the cam 5. At that time, the supported point 23 moves downward within the hole 21 against tensile force of the spring 27 while the lock member 32 rotates in clockwise direction due to tensile force of the spring 38 because the protuberance 34 thereof gets out of engagement with the downward slanting surface 25 (ref.: FIG. 4).

When the roller 10 passes over the highest position of the cam 5, the intermittent gear 3, when reaching such a position that the cut-off portion 4 thereof faces to the gear 2, gets out of meshing engagement with the gear 2 and the stopper member 12, which has returned to the stop position due to tensile force of the spring 14 because the release plunger 13 has been deenergized, engages with the protuberance 15 to hold the intermittent gear 3 there. On the other hand, the changeover 7 moves to the left due to tensile force of the spring 11 until the roller 10 gets in contact with the step portion 6 causing the protuberance 31 of the sector member 28 to move upward. The control member 22, which has got free from downward pressure caused by the protuberance 31, moves upward due to tensile force of the spring 27 until the upward slanting surface 26 gets in contact with the protuberance 34 of the lock member 32. Such locked condition where the upward slanting surface 26 is in contact with the protuberance 34 is held by holding force of the holding plunger 40 and tensile force of the spring 38. In this locked condition, the protuberance 23 of the control member 22 is locked slightly apart from the uppermost end of the hole 21, so that tensile force of the spring 27 effectively acts on the operating member 16 to surely hold it at the lowermost position (namely, the position where the head 19 is press-fit) (ref.: FIG. 5). This locked condition is thereafter held throughout play time of the cassette tape.

In the process from FIG. 2 to FIG. 5 and in the locked condition of FIG. 5, if a user wants to do an operation causing action for releasing the head, he may only deenergize the holding plunger 40. Then, the holding member 36 and the lock member 32 lose holding power of the holding plunger 40, so that tensile force of the springs 20 and 20' which upwardly energize the control member 22 through the operating member 16 overcomes tensile force of the spring 41 which energizes the control member 22 through the lock member 32 in clockwise direction. Accordingly, the control member 22, rotating in anti-clockwise direction in a manner avoiding the protuberance 31 of the sector member 28, gets out of the way of the protuberance 31. At the same time, the upward slanting surface 26, so pushing the protuberance 34 of the lock member 32 leftwardly to rotate the lock member 32 in anti-clockwise direction, gets out of the protuberance 34 and further moves upward until the lowermost end of the stroke limit hole 18 gets in contact with the guide pin 17 (namely, until the head 19 is released) and stops there. If the holding plunger 40 is deenergized substantially in a state as shown in FIG. 3, the system changes to a state as shown in FIG. 6. And, if the motor continues rotating, the intermittent gear 3, after continuously rotating from the position as shown in FIG. 6, stops at the position as shown in FIG. 1.

In the process from FIG. 2 to FIG. 5 and in the locked condition as shown in FIG. 5, also if the power source is interrupted, the operating member 16 immediately returns to the position to release the head 19 because the holding plunger 40 is deenergized in response to the interruption.

Figure 7:
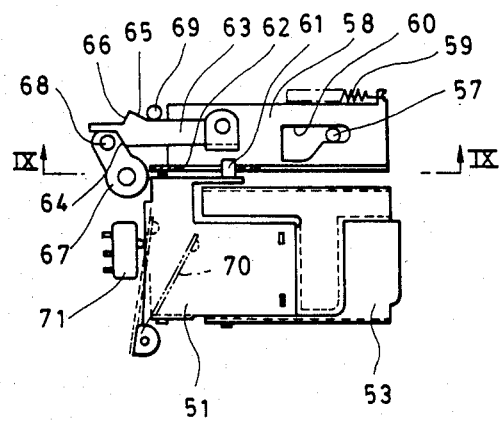
FIG. 7 is a partially cut-off plan view showing the part excluding the cam of another embodiment according to the present invention.
Figure 8:
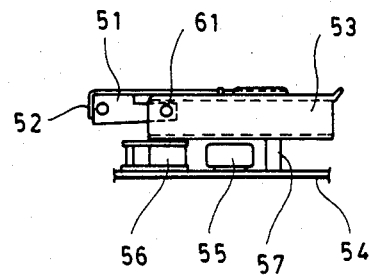
FIG. 8 is a front view of FIG. 7.
Figure 9:
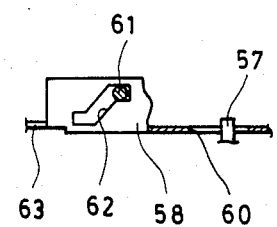
FIG. 9 is an axially sectional view as sectioned by IX—IX line in FIG. 7 and partially cut-off.

FIGS. 7 to 9 show another embodiment which is adopted to actions for setting a cassette and for pressfitting the head. Reference numeral 51 designates a pivotal member for pivotal movement about a support shaft 52 horizontally mounted on the fixture frame, 53 refers to a cassette guide hinged at the top end of the pivotal member 51 for up and down movement in response to pivotal movement of the pivotal member 51 keeping its horizontal state, and, 54 to a head plate mounted on the fixture frame for front and rear movement in FIG. 8, frontwardly energized by a spring, etc. not shown, and provided with a head 55, a pinch roller 56 and a protuberance 57. Numeral 58 denotes an operating member mounted on the fixture frame for right and left movement in FIG. 7, leftwardly energized by a spring 59, and provided with a guide hole 60 for engaging with a protuberance 57 formed on the head plate 54 and a guide hole 62 for engaging with a protuberance 61 formed on the pivotal member 51. Numeral 63 is a control member with a proximal end thereof being pivotally supported on the operating member 58 and having slanting surfaces 64, 65 and 66 like slanting surface 24, 25 and 26 in the foregoing embodiment. 67 is a swing member similar to the sector member 28 in the aforementioned embodiment for being swung in response to rotation of a cam not shown directly or through a changeover member so that a protuberance 68 thereof pushes the slanting surface 64 to move the operating member 58 to the left. Numeral 69 denotes a protuberance similar to the protuberance 34 of the lock member 32 in the former embodiment for engaging with the slanting surface 66 to lock the operating member 58 at the rightmost position if the control member 63 is pushed rightwardly while holding plunger not shown but similar to the plunger 40 in the former embodiment is energized. Numeral 70 designates an actuator for being pushed upon cassette insertion to thereby turn on a switch 71 and for pushing out the cassette upon taking out the cassette.

According to this embodiment, when a cassette is inserted in the cassette guide 53 to push the operating member 58 to the right, the protuberance 61 is guided downward along the guide hole 62 so that the pivotal member 51 rotates in clockwise direction in FIG. 8 causing the cassette guide 53 to shift down and set the cassette at the predetermined play position while the protuberance 57 is guided along the guide hole 60 to cause the head plate 54 to shift forwardly in FIG. 8 thus to press-fit the head 55 and the pinch roller 56 to the tape. When a user wants to release the cassette and the head while they are going to the setting position and the press-fitting position, respectively, he may deenergize the holding plunger and the operating member 58 immediately moves to the left to release then.

Although the control member 22 in the embodiment as shown in FIGS. 1 to 6 is pivotally supported in a manner movable in up and down direction with respect to the operating member 16, it may be pivotal only. Although the holding plunger 40 is arranged not only to hold the condition in the process from FIG. 2 to FIG. 5 but also to hold the locked condition as shown in FIG. 5, two holding members may independently be provided. Although these embodiments are adopted to magnetic tape devices, they are not limited to such devices.

Figure 10:
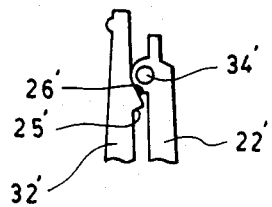
FIG. 10 is a plan view showing the main part of a further embodiment according to the present invention.

Further, the structure of the embodiment as shown in FIGS. 1 to 6 wherein the control member 22 is provided with slanting surface 25 and 26 and the lock member 32 is formed with the protuberance 34 for engaging with those slanting surface 25 and 26 may be replaced by such a structure as shown in FIG. 10 wherein a lock member 32' is provided with slanting surfaces 25' and 26' while the control member 22' is formed with a protuberance 34' for engaging those slanting surfaces 25' and 26'.

Beside these, the present invention may be put in various modifications and alterations.

We claim:

1. A power transmission system, comprising:
   a rotatable power member;
   a rotatable engage member defining with said power member an intermittent power transmission device so that rotation of said power member imparts intermittent rotation to said engage member, said engage member having a rest period in which it does not rotate during each revolution of said power member;
   a rotatable cam member coupled to said engage member for simultaneous rotation therewith;

a changeover member and means mounting said changeover member for shifting movement in response to rotation of said cam member between a first position and a second position;

select means for selectively releasably holding said changeover member in said first position or releasing said changeover member so that said changeover member is free to shift to said second position in response to rotation of said cam member;

an operating member and means mounting said operating member for shifting movement between third and fourth positions;

a movable control member operatively connected between and coupled to said changeover member and said operating member for causing said operating member to shift between said third and fourth positions in sequence with and in response to movement of said changeover member between said first and second positions;

a movable lock member releasably lockingly engageable with said control member to releasably lock same against movement when said operating member is in said fourth position whereby to hold said operating member in said fourth position; and release means for releasing said control member from locking engagement with said lock member whereby to permit said operating member to be shifted to said third position.

2. A power transmission system according to claim 1 in which said release means comprises a holding plunger adapted to be energized or deenergized and a shiftable holding member attractable by said holding plunger when said holding plunger is energized, said holding member being connected to said lock member so that said lock member is moved into locking engagement with said control member when said holding plunger is energized and is moved out of locking engagement with said control member when said holding plunger is deenergized.

3. A power transmission system according to claim 1 in which said select means comprises a release plunger adapted to be energized or deenergized, a stopper member adapted to be moved in response to energization or deenergization of said release plunger and a protuberance on said engage member, said stopper member being engageable with said protuberance when said release plunger is deenergized and when said engagement member is in said rest position.

4. In a tape recorder, a power transmission system, comprising:

a first rotatable gear adapted to be driven by a motor;

a second rotatable gear defining with said first gear an intermittent gearing so that rotation of said first gear imparts intermittent rotation to said second gear, said second gear having a toothless portion so that it is out of driving engagement with and is not driven during a selected portion of each revolution of said first gear;

a rotatable cam member affixed to said second gear for simultaneous rotation therewith;

a changeover member and means mounting said changeover member for shifting movement in response to rotation of said cam member, in a direction transverse to the axis of rotation of said cam member, between a first position and a second position;

a stopper for releasably holding said changeover member in said first position when said second gear is out of driving engagement with said first gear and a selectively operable release device for releasing said stopper so that said changeover member is free to shift to said second position in response to rotation of said cam member;

an operating member and means mounting said operating member for shifting movement between third and fourth positions;

a tape head mounted on said operating member for simultaneous movement so that said tape head can be moved into and out of engagement with a tape;

a pivotally mounted control member on said operating member and a pivotally mounted sector member connected to said changeover member for being pivoted in response to shifting of said changeover member, said control member and said sector member having interengaging portions for causing said operating member to shift between said third and fourth positions in sequence with and in response to movement of said changeover member between said first and second positions;

a pivotally mounted lock member releasably lockingly engageable with said control member to releasably lock same against movement when said operating member is in said fourth position whereby to hold said operating member in said fourth position; and release means for releasing said control member from locking engagement with said lock member whereby to permit said operating member to be shifted to said third position.

* * * * *